United States Patent
Seils et al.

(10) Patent No.: US 9,731,538 B2
(45) Date of Patent: Aug. 15, 2017

(54) SECURITY DEVICE

(71) Applicant: SECTAGO GmbH, Saarbrucken (DE)

(72) Inventors: Frank Seils, Kleines Wiesental (DE); Markus Koch, Pirmasens (DE); Peter Rogin, Saarbrucken (DE)

(73) Assignee: SECTAGO GMBH, Saarbrucken (DE)

( * ) Notice: Subject to any disclaimer, the term of this patent is extended or adjusted under 35 U.S.C. 154(b) by 0 days.

(21) Appl. No.: 14/764,709

(22) PCT Filed: Jan. 20, 2014

(86) PCT No.: PCT/EP2014/051039
§ 371 (c)(1),
(2) Date: Jul. 30, 2015

(87) PCT Pub. No.: WO2014/124781
PCT Pub. Date: Aug. 21, 2014

(65) Prior Publication Data
US 2015/0352881 A1 Dec. 10, 2015

(30) Foreign Application Priority Data
Feb. 12, 2013 (EP) ..................................... 13154954

(51) Int. Cl.
B42D 25/30 (2014.01)
B42D 25/29 (2014.01)
(Continued)

(52) U.S. Cl.
CPC ........... B42D 25/29 (2014.10); B42D 25/324 (2014.10); B42D 25/328 (2014.10); G02B 5/18 (2013.01);
(Continued)

(58) Field of Classification Search
CPC ...... B42D 25/324; B42D 25/328; G02B 5/18; G02B 5/1842; G02B 5/1847; G02B 5/188
(Continued)

(56) References Cited

U.S. PATENT DOCUMENTS

| 5,447,335 A * | 9/1995 | Haslop | G03H 1/0011 283/91 |
| 6,342,969 B1 * | 1/2002 | Lee | G02B 5/1842 359/2 |

(Continued)

FOREIGN PATENT DOCUMENTS

| CN | 101484323 A | 7/2009 |
| CN | 101494831 A | 7/2009 |

(Continued)

OTHER PUBLICATIONS

CN Appln. No. 201480008436.3, Office Action, May 17, 2016, 9 pg.

Primary Examiner — William R Alexander
(74) Attorney, Agent, or Firm — Cuenot, Forsythe & Kim, LLC

(57) ABSTRACT

A security device includes a plurality of diffractive surface elements arranged on a carrier element. Each individual diffractive surface element can have a three-dimensional surface structure. A portion of the plurality of the diffractive surface elements can form a first surface element group. An orientation of the diffractive surface elements in the first surface element group can be matched to each other wherein they make a first point of an associated symbol to be represented visible. A plurality of additional surface element groups each can make a respective additional point of the symbol to be represented visible. The symbol can include a sum of all points represented by the first surface element group and the plurality of additional surface element groups. A movement of the symbol can be perceived by the con-
(Continued)

tinuous change in an angle of incidence of the light or an observation angle.

20 Claims, 5 Drawing Sheets

(51) Int. Cl.
- *G02B 5/18* (2006.01)
- *B42D 25/328* (2014.01)
- *B42D 25/324* (2014.01)

(52) U.S. Cl.
CPC ............ *G02B 5/188* (2013.01); *G02B 5/1842* (2013.01); *G02B 5/1847* (2013.01); *Y10T 29/49828* (2015.01)

(58) Field of Classification Search
USPC .......................................... 359/567, 558, 566
See application file for complete search history.

(56) References Cited

U.S. PATENT DOCUMENTS

| | | | | |
|---|---|---|---|---|
| 2005/0057789 A1* | 3/2005 | Funada | ................. | B29C 59/022 359/31 |
| 2006/0097515 A1* | 5/2006 | Raksha | ................. | B05D 3/207 283/91 |
| 2006/0145468 A1* | 7/2006 | Plaschka | ................. | B41M 3/14 283/72 |
| 2007/0058260 A1* | 3/2007 | Steenblik | ........... | G02B 27/2214 359/626 |
| 2007/0268536 A1* | 11/2007 | Holmes | ................ | G03H 1/0011 359/2 |
| 2010/0315714 A1* | 12/2010 | Tompkin | ............... | B42D 25/328 359/571 |
| 2012/0127547 A1* | 5/2012 | Gocho | ................. | G02B 5/0236 359/2 |
| 2012/0162271 A1 | 6/2012 | Hsieh | | |
| 2013/0029112 A1* | 1/2013 | Bargir | ..................... | B41F 11/02 428/195.1 |
| 2015/0331160 A1 | 11/2015 | Rogin et al. | | |

FOREIGN PATENT DOCUMENTS

| | | |
|---|---|---|
| CN | 104968503 A | 10/2015 |
| EP | 2239150 A1 | 10/2010 |
| WO | 9402844 A1 | 2/1994 |
| WO | 9428444 A1 | 12/1994 |
| WO | 9502200 A1 | 1/1995 |
| WO | 0203109 A1 | 1/2002 |
| WO | 2010115936 A1 | 10/2010 |
| WO | 2014086715 A1 | 6/2014 |

* cited by examiner

SECURITY DEVICE

CROSS-REFERENCE TO RELATED APPLICATIONS

This application claims the benefit of International Patent Application Number PCT/EP2014/051039 filed on Jan. 20, 2014, which claims the benefit of European Patent Application Number EP 13154954.5 filed on Feb. 12, 2013. Patent Applications PCT/EP2014/051039 and EP 13154954.5 are fully incorporated herein by reference.

BACKGROUND

The present invention relates to a security device.

A large number of security devices are provided in relation to high-security documents, in particular identity documents like passports, identity cards, driving licenses and the like as well as payment means like credit cards, bank notes and the like. This involves, for example, the provision of security devices which are visible to the human eye like holograms. In addition, there are also provided security devices which are not visible to the human eye or which are visible only under special light and which are produced, for example, by dye pigments introduced into the high-security document.

WO 94/28444 A1 and WO 95/02200 A1 describe the production and function of diffractive security features produced by the combination of various conventional diffractive security features like pixelgrams, kinegrams, mathematical holograms and the like. In the case of WO 95/02200 A1 the combination is generated by the superpositioning of the associated grating structures in at least one part of the surface of the combined security feature. WO 94/28444 A1 in contrast relates to a pixelated security feature whose individual pixels are subdivided into subpixels, wherein each individual one of those subpixels is configured in accordance with precisely one of the original security features. The totality of the subpixels is thus subdivided into groups of subpixels, wherein each group represents precisely one of the original security features. In that case the arrangement of the subpixels of a group follows a regular pattern as the association of the subpixels with the respective group remains the same within the higher-level pixels of the combined security feature.

Both WO 94/28444 A1 and also WO 95/02200 A1 thus describe possible ways of superpositioning various diffractive security features in such a way that the viewer can perceive those features on the same surface, wherein the visibility of the individual features is influenced by the combination of illumination and viewing angles.

WO 2010/115936 discloses a security device which is particularly suitable for payment means. It has a reflection layer like an aluminum film on the top side of which is arranged a multiplicity of diffractive surface elements. The individual surface elements have a sinusoidal surface structure for producing a diffraction grating. The individual surface elements in that case are of such a configuration that incident light is diffracted in such a way as to give the observer an impression similar to natural asterism. An observer thus sees, for example, a star-shaped symbol which rotates about itself in an image plane.

A security device with another movement effect is described in WO 02/03109. This involves a holographic optically variable image which is produced by a grating structure which is continuously variable as a function of location. The representation of that image follows a predetermined path when the security device is tilted in a first direction. To achieve a sharp image when viewing under white light in that case only a narrow wavelength range is shown in the manner of a rainbow hologram, the wavelength range depending on the rotation of the security device perpendicularly to the first direction. In the case of a tilting movement in that second direction therefore no movement is observed, but instead a change in color.

SUMMARY

A security device includes a plurality of diffractive surface elements arranged on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group comprising the portion of the plurality of diffractive surface elements. An orientation of the diffractive surface elements in the first surface element group can be matched to each other wherein they make a first point of an associated symbol to be represented visible to an observer under particular observation conditions. A plurality of additional surface element groups each can make a respective additional point of the symbol to be represented visible. The symbol can include a sum of all points represented by the first surface element group and the plurality of additional surface element groups. A movement of the symbol, which is continuous for the observer in an observation space, can be perceived by a continuous change in an angle of incidence of light or an observation angle.

A method of producing a security device includes arranging a plurality of diffractive surface elements on a carrier element. A surface covered by the diffractive surface elements on the carrier element can occupy at least a partial region of the carrier element. Each individual diffractive surface element can have a three-dimensional surface structure. A portion of the plurality of the diffractive surface elements can form a first surface element group comprising the portion of the plurality of diffractive surface elements. An orientation of the diffractive surface elements in the first surface element group can be matched to each other wherein they make a first point of an associated symbol to be represented visible to an observer under particular observation conditions. A plurality of additional surface element groups each can make a respective additional point of the symbol to be represented visible. The symbol can include a sum of all points represented by the first surface element group and the plurality of additional surface element groups. A movement of the symbol, which is continuous for the observer in an observation space, can be perceived by a continuous change in an angle of incidence of light or an observation angle.

DETAILED DESCRIPTION

Figure 1:
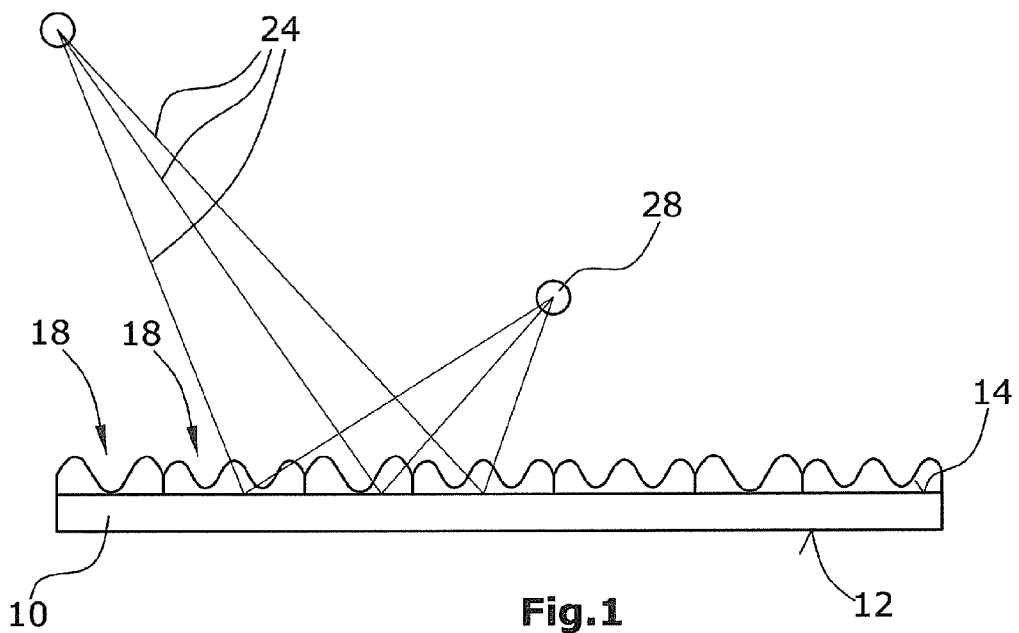
FIG. 1 shows a diagrammatic side view of a portion of an embodiment of a security device according to the invention.

The present invention concerns a security device for improving the counterfeit protection of articles worthy of protection, for example, original articles, such as products, marks and brand names, admission tickets and documents. Other examples include high-security documents such as identity documents and means of payment.

The object of the invention is to provide such a security device. According to an embodiment of the invention, that object is attained by a security device for improving counterfeit protection of articles.

In accordance with an aspect of the invention the security device has a plurality of diffractive surface elements on a carrier element. The surface covered by the surface elements can occupy a partial region of any shape of the carrier element. The individual surface elements can have different base surfaces such as circles, polygons, etc. or combinations. A surface structure is provided at their top side at which the light is diffracted. The surface structure is, in particular, a diffraction grating with any surface profile, for example, sinusoidal, rectangular or triangular. The basic shape, which can be any shape, of the surface profile can also be in the form of a step profile. Those diffraction gratings can be transparent on a transparent or reflecting carrier element or they can also be reflecting themselves.

As a consequence of their surface structure the surface elements deflect incident light in given directions. When using diffraction gratings the incident light is, in particular, split up in a plurality of diffraction orders, wherein each diffraction order corresponds to a characteristic change in direction of the diffracted light. The following description now relates firstly to an individual one of those diffraction orders.

In an aspect of the invention a respective plurality of surface elements are preferably arranged distributed over the entire surface form a surface element group. The surface structures of the individual surface elements of such a group are matched to each other in such a way that, under any observation conditions, that is to say any combination of light incidence and viewing angles, there is always only a selection of given surface elements of that group that diffract the incident light in the direction of the observer. Those selected surface elements are preferably in close proximity with each other so that the observer perceives a bright point at the location in question. If now the light source and/or the observer change their position then other surface elements of the same group now deflect the incident light to the observer so that the bright point is visible at another location. According to an embodiment of the invention in that respect the diffraction gratings are so matched to each other that, in a continuous variation in the observation conditions, the observer perceives a continuous movement of the bright point.

The totality of the surface elements of the security device now comprises a plurality of such groups which in the described manner, under given illumination and observation conditions, produce bright light points at various position of the surface of the security device, which surface is covered by the surface elements. In that case the sum of those bright light points is perceived by an observer as a symbol which is moved upon a change in the observation conditions as a whole over the surface of the security device. The illustrated symbol can be any symbol, in particular a geometrical symbol such as, for example, a circle, a smiley, letters or digits, but also a complex logo, or a combination of such symbols. In that case the path which the movement of the illustrated symbol follows is not predetermined along a one-dimensional curve, but instead arises out of the interplay of illumination and viewing angles which can respectively vary in two directions. Correspondingly that path can in principle also cover the entire two-dimensional surface of the security device.

In a simple configuration the movement of the symbol involves a shift which is proportional to the change in direction of the light, which corresponds to the respective observation conditions. The position of the symbol which corresponds to a vanishing change in direction, that is to say direct reflection or transmission, appears in that case as a focus about which the symbol appears to circle upon a corresponding movement of the observer and/or the light source.

In other configurations, instead of the above-mentioned isotropic proportionality between the change in direction of the light and the position of the symbol, it is possible to select a different functional dependency. A preferred configuration involves applying a proportionality with greatly different proportionality constants in two mutually perpendicular directions of movement so that an observer approximately perceives a linear movement of the symbol. This embodiment is particularly suitable for strip-shaped security elements as can advantageously be provided, for example for use on bank notes.

It is equally possible to use non-linear functional dependencies so that, for example, the movement of the symbol appears to follow a distorted path or can even be limited to curved partial regions of the surface of the security element.

In the case of deviations from simple proportionality between the change in direction of the light and the position of the symbol, an observer generally has the impression as though the symbol were viewed through a distorting mirror. That is because together with the production of a complex path of movement, distortion of the symbol is also afforded at the same time. In certain embodiments that distortion can be compensated by a suitably distorted configuration of the symbol used as the basic implementation. Another possibility provides defining different movement patterns for the various points of the illustrated symbol so that in total a non-distorted symbol seems to follow a distorted path.

In a further embodiment different points of the symbol follow different movement patterns. That gives the impression of a continuous variation in the illustrated symbol as a function of the observation conditions without, however, the symbol as a whole following a distorted path.

As mentioned in the opening part of this specification the foregoing statements relate to an individual diffraction order. In general a plurality of diffraction orders of different intensity are produced by the grating structures, wherein the intensity relationships are determined by the details of the grating profile used and the materials employed. An advantageous embodiment shows the great emphasis of a single diffraction order over all other diffraction orders. That can be achieved, for example, by a suitable asymmetry of the grating profiles.

In another advantageous configuration substantially two mutually symmetrical diffraction orders, in particular the two first diffraction orders, are emphasized over all other diffraction orders. The suppression implemented for the purpose of higher diffraction orders can be achieved, for example, by the grating profile being of a suitable implementation.

If now an individual one of the groups of surface elements is viewed under given observation conditions then for each of the visible diffraction orders, the condition that the light is deflected in the direction of the observer is fulfilled at another position in the surface of the security device. Accordingly, a plurality of implementations of the illustrated symbols are represented at different positions. In the stated case where the visual overall impression is produced substantially by the two first diffraction orders, two implementations of the symbol will become visible. On the assumption that the functional dependency between the change in direction of the light and the position of the symbol is symmetrical with respect to a main focus the two implementations of the symbol, upon a change in the observation conditions, describe mutually opposite paths in relation to that focus.

Based on that general description of the mode of operation of the security device it is now possible to embody various variants, of which some advantageous embodiments are described hereinafter. Those variants can be combined together in a suitable fashion without each of those possible combinations being discussed in greater detail.

In a first embodiment the surface of the security element is subdivided into a plurality of surface portions in which different symbols are shown. In that case the focuses of the symbols represented in the various partial regions are so selected that they conform with each other. Thus the observer has the impression that the symbols merge into each other in the boundary region of the surface portions. That boundary region can be both in the form of a sharp line and also a diffuse transitional region. In a special case of that configuration adjacent surface portions can have only slightly altered shapes in respect of a single initial symbol. As a result the observer has the impression of a stepwise change in the initial symbol during its continuous movement along the curved path.

A further embodiment involves the representation of a plurality of symbols with different (at least two) focuses. That can be effected either by subdividing the surface into a plurality of surface portions which respectively contain the information for a given symbol and its focus, or also by the diffuse arrangement of the respective surface element groups. In that case the observer, in particular for the form of arrangement set forth hereinafter, has the impression of symbols which pass through each other in their movement. By virtue of the positioning of the focuses in the boundary region of the surface covered with the surface elements or just outside the surface covered by the surface elements, it is possible for one of the two first diffraction orders to be faded out at a maximum over the entire angular range.

A further embodiment is provided when selectively a plurality of adjacent surface elements are brought together to give a combined surface element. Grating constant and orientation of, for example, only one of the surface elements which have been brought together are associated with that combined surface element. In that way individual points of the symbol are emphasized among special angle combinations, which gives a sparkly impression to the observer in the movement of the symbol. Advantageously between 0.1% and 50% of the surface elements are combined together in that form.

In a further embodiment the security device according to the invention is supplemented by an additional light-refracting layer such as, for example, a microprism array, a microlens array or other light-refracting elements. By using suitable light-refracting elements, the observer, for example, is presented with a replication of the symbols produced which move in respective groups about the focus previously established in the security device or about the fixed focuses.

In a further aspect of the invention the displayed symbol is visible within a wide range of viewing angles of, in particular, more than 60° and particularly advantageously more than 90°. That requires a wide range of variation in the configuration of the surface structures, and the orientation of the surface structures can assume any desired angle in the carrier element surface. A large variation in the grating constants is also advantageous. In particular, the simultaneous use of very small and large grating constants is recommended for that purpose. Advantageously, the range of the simultaneously used grating constants is between <500 nm (>2000 lines/mm) and >1500 nm (<666 lines/mm), particularly advantageously between <300 nm (>3333 lines/mm) and >5000 nm (<200 lines/mm). It is advantageous for the size relationship of the largest to the smallest grating constants on the surface structures to be in a relationship of at least 3:1, and particularly advantageously to be at least 10:1.

It is further advantageous if the surface elements are of such a nature that the symbol is respectively produced by less than 10%, for example less than 5%, of the surface elements provided on the carrier element.

Advantageously the surface structured on the carrier element is covered with surface elements to at least 10%, at least 30% or particularly advantageously at least 50%. Such a filling factor for the surface with surface elements makes it possible to produce a clearly visible symbol of sufficient brightness so that the symbol can be perceived, in particular, by the human eye without any aid.

The security device according to aspects of the invention can be transparent, reflective or also semi-reflective, that is to say semi-translucent. The transparent configuration is used, in particular, when the security check on the article to be protected is to be effected by viewing therethrough and the article itself is at least partially translucent.

One or more sides of the security device according to aspects of the invention can be of such a nature that they reflect light incident thereon. For that purpose, for example, the carrier element at an underside and/or at a top side and/or the surface elements can have a light-reflecting layer. For example, this may respectively involve a layer comprising a metal such as, for example, aluminum, silver, copper, gold or chromium. It will be appreciated that metal alloys and/or combinations of different metals are also suitable. Reflecting thin-film layer elements are also suitable, as are afforded, for example, by dielectric or cholesteric layers. The provision of an aluminum layer is particularly suitable. Particularly in a configuration having light-reflecting layers at at least two sides it is advantageous for at least one of those layers to be semi-translucent. The provision of reflecting layers is dependent, in particular, on the situation of use of the security device. Thus reflection layers as a component part of the security device are useful, in particular when the security check on the article to be protected is to be effected by viewing thereon and light incident thereon is not reflected or is inadequately reflected by that article itself.

For production of the surface elements it is possible to apply to the carrier element a lacquer which is hardenable, that is to say, for example, it is chemically cross-linkable, and to produce the individual surface elements, in particular the surface structure of the surface elements, by way of a shaping element. Hardening of the lacquer is then effected, for example, by means of UV light and/or by the action of heat. After shaping of the surface elements the hardened lacquer layer is advantageously of a thickness of between 0.5 and 300 µm, particularly advantageously between 0.8 and 50 µm or between 1 and 10 µm. The carrier element and/or the surface elements advantageously has/have a polymer material or is/are made from polymer.

Production of the surface elements can be effected in such a way that the carrier element comprises a thermoplastic material or has thermoplastic material and structuring of the individual surface elements is transferred from a shaping element on to the thermoplastic material. That can be effected, for example, by means of embossing processes, advantageously using pressure and/or heat.

To produce the diffractive elements constituting the security device information relating to the configuration of three-dimensional surface structures on a plurality of surface elements is firstly generated, in particular by means of data processing programs. That is effected in that, as described hereinbefore with reference to the security device, surface element groups are formed from a plurality of surface elements and the surface structures and the orientation of the surface element groups are so matched to each other that, under given observation conditions, it is possible to see a point of the symbol to be represented, at the provided position. In addition information is further generated, by which a plurality of surface element groups are set up in such a way that they respectively represent a point so that the symbol to be represented is composed of the sum of all points shown by the surface element groups. The plurality of diffractive surface elements with three-dimensional surface structures is arranged on a carrier element on the basis of the generated information, for production of the security device.

It is particularly advantageous for the security device according to the invention to be provided on or in payment means such as bank notes, checks, credit cards and the like. Other high-security documents such as passports, identity cards, driving licenses, social security cards and so forth can also be provided with the security device according to aspects of the invention for simple checking as to whether the situation involves an original article or a counterfeit. That security device has, in particular, the advantage that it can be viewed by an observer without the assistance of particular reading devices or other aid.

The provision of a security device according to aspects of the invention is also advantageous on documents such as share certificates, tax labels, deeds, entrance tickets, entry permits and so forth. That applies also for products and brands and marks such as drugs, spirits, tobacco goods, replacement parts, luxury goods and so forth.

The security device according to an embodiment of the invention can be machine-readable. Machine-readability can advantageously also be made possible or simplified by virtue of the security device according to the invention being combined, for example with such security features and/or classes of substance which, in particular, have diffractive, refractive, reflective, polarizing, phase-shifting, electrically conductive, magnetic, colored, fluorescent, phosphorescent and/or other luminescent properties. Combinations of the security device according to the invention with electronic components such as, for example, RFTD chips, printed electronics and the like are also advantageous for permitting or improving machine-readability.

Combination with one or more further security features is also possible, for example with a hologram. A combination can be implemented either—corresponding to the state of the art—by recombination of individual independent security devices or—in accordance with an aspect of this invention—jointly with the production of the security device according to the invention. In that respect the arrangement of individual independent security features can be effected, for example in spatial separation relative to each other and/or in the form of diffuse superpositioning of a plurality of security features. The combination of the security device according to the invention with refractive elements such as, for example, lenses, prisms and the like is also possible. Other combinations, of virtually any kind, with further light-influencing layers or materials are also possible, as are known, for example in the form of dyestuffs and/or pigments and/or optical filter elements and/or so-called "optical markers".

The invention is described in greater detail hereinafter by means of a preferred embodiment with reference to the accompanying drawings.

In the first illustrated embodiment (FIG. 1) the security device according to the invention has a reflective carrier element 10 which involves, for example, a metal film or a carrier element of, for example, polymer, paper or the like with an applied metal layer, for example, of aluminum vapor-deposited thereon. The reflective carrier element 10 is arranged, for example, with an underside 12 on a product to be safeguarded such as a credit card, a bank note or the like. If the product to be safeguarded is entirely or partially transparent a further configuration of the reflective carrier element 10 is, for example, such that it is arranged with a top side 14 towards the side of the product. A plurality of diffractive surface elements 18 is arranged at a surface 14 of the reflective carrier element 10. The individual surface elements 18 are in the form of diffraction gratings. The individual surface elements can be produced, for example, in one process step by a lacquer being applied to the surface 14 of a carrier element 10 and structured by way of a shaping element. In that respect a lacquer is advantageously used, which can be hardened by UV radiation or the action of heat. In this case the hardened lacquer layer after shaping of the surface elements 18 is advantageously of a thickness of 0.8-50 µm. In addition the individual surface elements can be produced, for example, in one process step by the reflective carrier element 10 comprising a thermoplastic carrier element in which the surface elements 18 are directly structured by way of a shaping element, for example by means of a hot embossing process. In the last-mentioned case, unlike the situation diagrammatically shown in FIG. 1, there would not necessarily be an interface 14 between the reflective carrier element 10 and the surface elements 18.

Incident light beams 24 are reflected at the surface 14 of the reflective carrier element 10, after diffraction has possibly already occurred upon passing into the lacquer layer or the thermoplastic carrier element. On issuing from the surface elements the light beams are diffracted into various directions at the outside surface of the individual diffraction gratings. Surface elements which belong to the same surface element group and are in close proximity with each other diffract the light beams in such a way that they approximately meet at a common point 28. Viewed over the entire surface of the security device the position of that point can steadily vary, even with an unchanged angle of incidence, in such a way that a large multiplicity of movement patterns is possible. The beams which are shown in the form of lines are illustrated in simplified form so that only reflection at the surface 14 is shown, and not the diffraction occurring in or at the surface elements 18.

Figure 3:
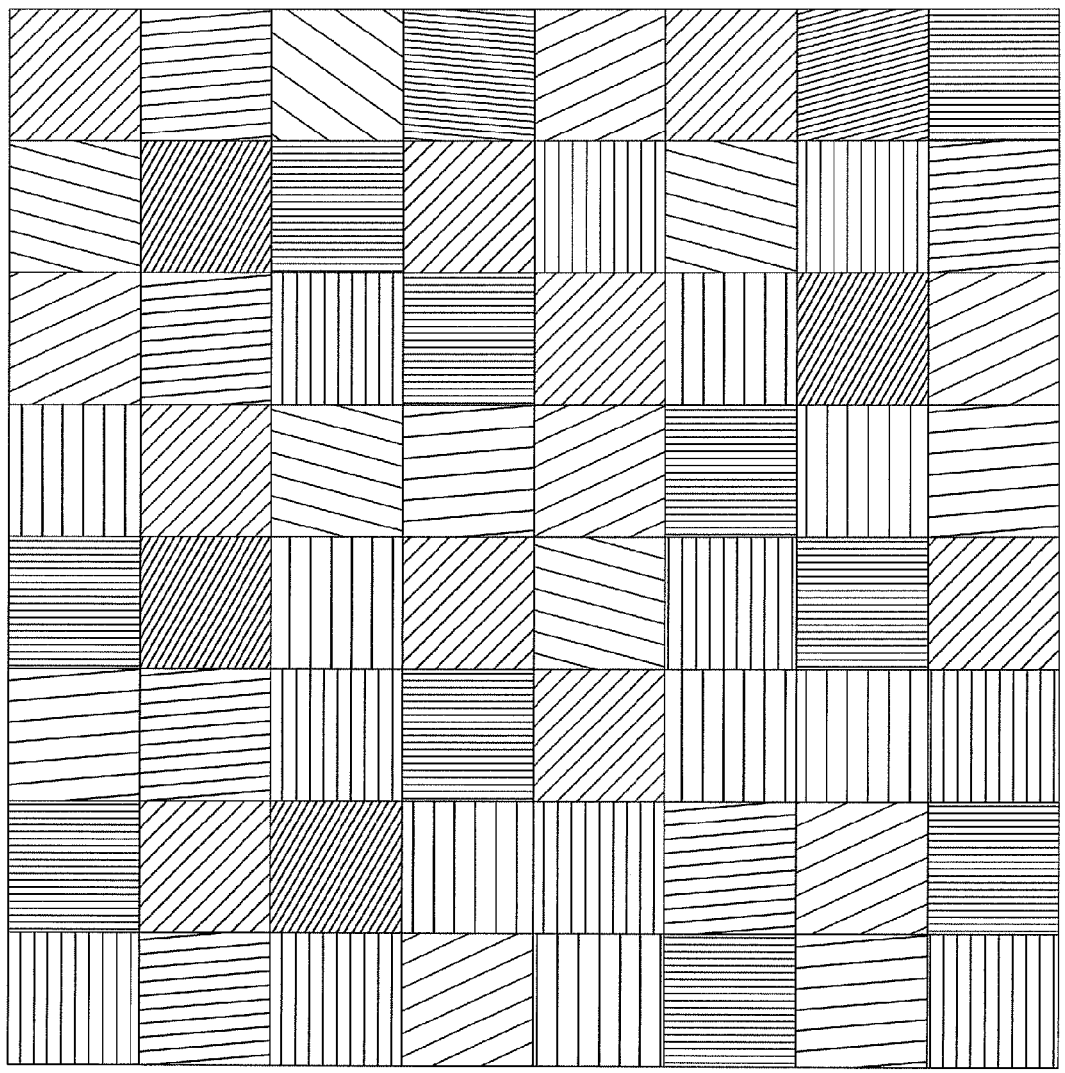
FIG. 3 shows a diagrammatic plan view showing the principle of the security device according to the invention.
Figure 4:
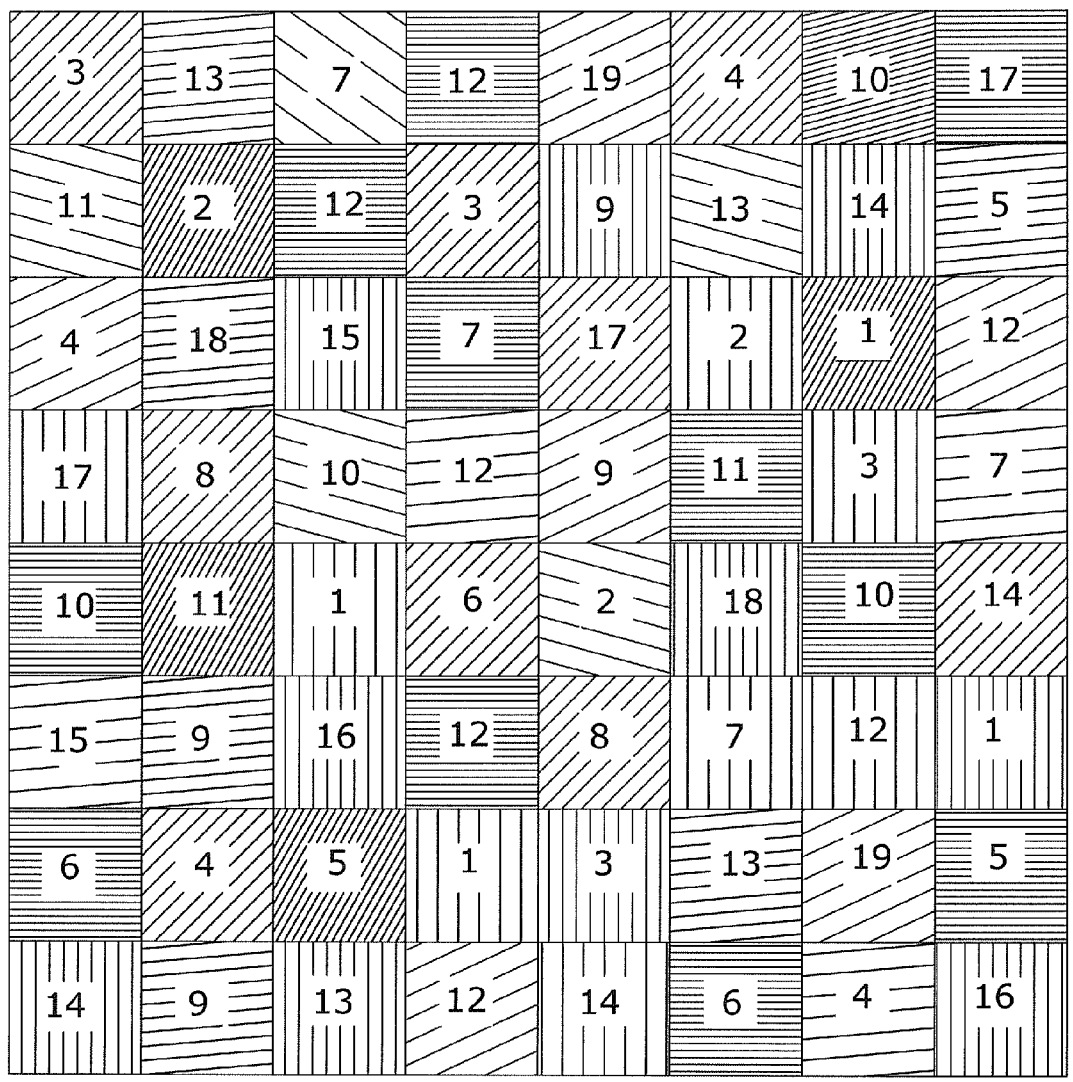
FIG. 4 shows a diagrammatic plan view showing the principle of a security device according to the invention, wherein surface element groups are denoted by numbers for illustration purposes.

As explained hereinafter, in particular with reference to FIGS. 3 and 4, the representation of a point 28 is effected by a group of a plurality of individual surface elements 18. The moving point 28 is always represented by the same surface element group by virtue of the change in the light incidence and/or observation angle. Therefore the representation of a symbol is effected by the representation of a plurality of points so that a plurality of surface element groups are arranged on the carrier element 10 corresponding to the number of points of the symbol that are to be represented.

Figure 2:
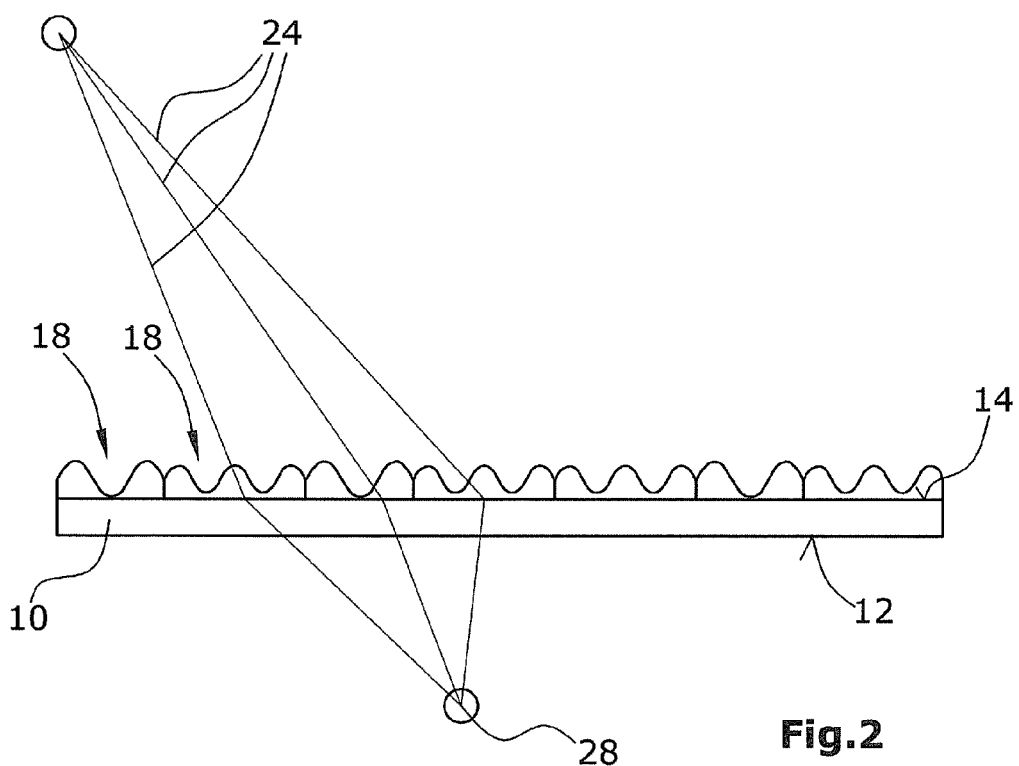
FIG. 2 shows a diagrammatic side view of a portion of a further embodiment of a security device according to the invention.

Instead of the provision of a reflective security device it can also be of a transparent nature by means of a transparent carrier element (FIG. 2). The beams 24 thus pass through the surface elements 18 and the carrier element 10 wherein, as described with reference to FIG. 1, a point 28 is represented in space by the group of surface elements 18.

The individual surface elements 18 have diffraction gratings, these being only diagrammatically illustrated in FIGS. 1 and 2.

In this embodiment of the invention the security device has a plurality of surface elements 18 on a reflecting or transparent carrier element. The individual surface element groups are made up of a plurality of surface elements 18 irregularly distributed on the carrier element. The composition of the surface element group is shown as an example in FIGS. 3 and 4. FIG. 3 shows an example of a diagrammatic plan view of a multiplicity of surface elements which are shown as squares and in which different grating structures are diagrammatically illustrated by lines. The individual surface elements have grating structures with grating constants in the range of between <500 nm and >1500 nm, particularly preferably between <300 nm and >5000 nm. In FIG. 3 some surface elements have identical structures. FIG. 4 then shows an example in which surface elements 18 are combined together to form surface element groups. In FIG. 4 individual groups are identified by numbers 1, 2, 3, . . . for illustration purposes. In this case a surface element 18 is arranged in each square provided with a number. The individual surface elements 18 of a surface element group have, in particular, surface elements 18 with different surface structures (FIG. 3). The surface structure varies, in particular, in its orientation or alignment. In addition the surface structure varies in regard to the height or amplitude of the individual gratings and the period thereof.

Figure 5:
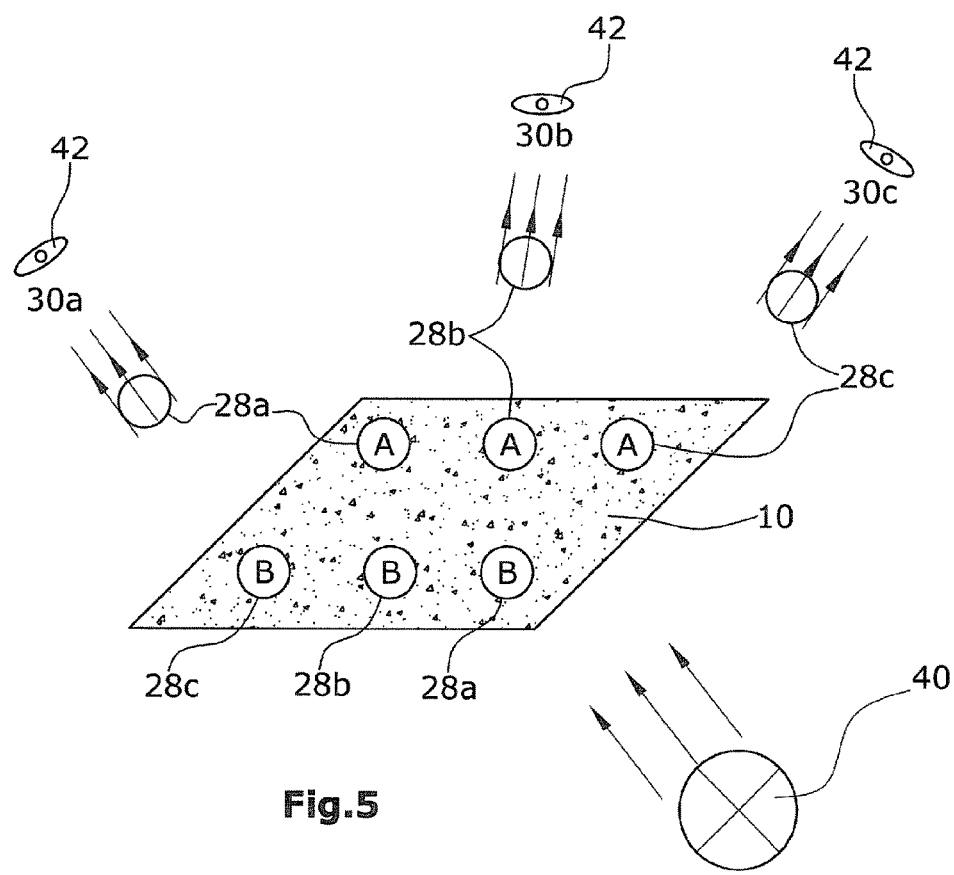
FIG. 5 shows a diagrammatic perspective view illustrating the principle of a security device according to the invention.

FIG. 5 shows in principle a configuration of a security device according to the invention. The carrier element 10 is provided with a multiplicity of individual surface elements 18 which are shown as points of differing configurations. Individual ones of the surface elements shown here are respectively combined together to give groups, as can be seen, for example by reference to FIG. 4. Light is projected by a light source 40 on to a rear side of the carrier element 10 which is transparent in this embodiment. In this embodiment, to check the security element or to detect a movement of the symbol an observer 42 moves from a position 30*a* to a position 30*b* and from that to a position 30*c*. The number and arrangement of the surface elements is so selected that, as shown by the line 32, in the case of a continuous change in the observation angle, the symbol composed of points 38 continuously moves. In that situation the observation angle in the illustrated embodiment changes from the observation angle 30*a* by way of the observation angle 30*b* to the observation angle 30*c*.

A corresponding consideration applies for the situations where the angle of light incidence continuously changes or the light incidence and observation angles continuously change at the same time. A simultaneous change in the light incidence and observation angles occurs, for example when the security element or the carrier element 10 is moved.

Figure 5A:
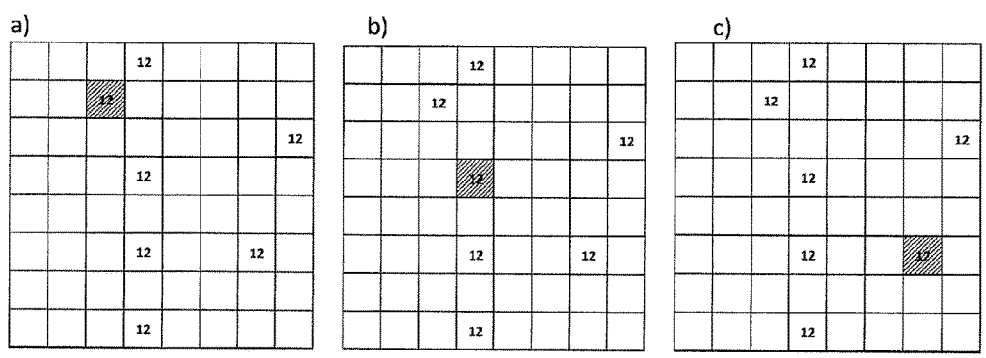
FIG. 5a shows a diagrammatic view of an individual group of surface elements on a security element.

FIG. 5*a* shows by way of example a diagrammatic view of an individual group of surface elements on the security element. Based on FIG. 4 the group "12" comprising seven surface elements was selected for this by way of example. In this case the surface elements are still preferably irregularly arranged on the carrier element and can also all be interchanged in position on the carrier element with other surface elements, such as surface elements belonging to other groups, with adaptation of the respective parameters (grating period and grating vector). For illustration purposes the surface elements are in a matrix form, wherein the same respective surface elements are shown in the three matrices illustrated. The three matrices show the action of a change in position of an observer, for example corresponding to the observation positions 30*a*, 30*b* and 30*c* shown in FIG. 5, wherein the surface elements which are visible to the observer at the respective observation angle are shown in hatched form. A sub-set of the entire surface elements of a group always makes a contribution to the illustrated point. Thus, with a given observation angle, not all surface elements of a given group contribute to representing a point. If the position of the observer and thus the observation angle changes then the surface elements contributing to the representation alter. In that case the illustrated point however is still represented by surface elements of the same group. Upon a change in the observation angle therefore the point is represented by partially different or completely different surface elements of the same surface element group.

Figure 6:
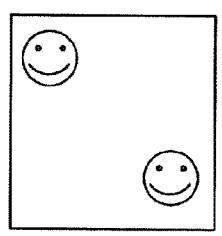
FIG. 6 shows a diagrammatic view of the symbols perceived by the observer at different angles.
Figure 6:
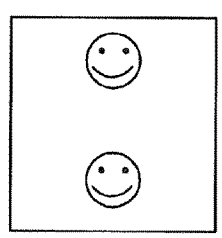
Figure 6:
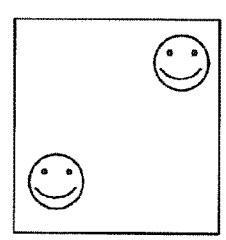

FIG. 6 shows as a simplified view how a symbol can move from the point of view of the observer. With an observation angle 30*a* the observer sees two symbols shown here as smileys. In this case, for example, the symbol in the top left corner is produced by the +1st order diffraction and the symbol in the bottom right corner is produced by the −1st order. When the observer moves to the position 30*b* (FIG. 5) the symbol moves from the top left corner towards the right into the center and the symbol moves from the bottom right corner towards the left into the center. In the position 30*c* the upper symbol further moves towards the right into the top right corner and the lower symbol further moves towards the left into the left corner. The observer thus sees a continuous movement of the two symbols.

Figure 7:
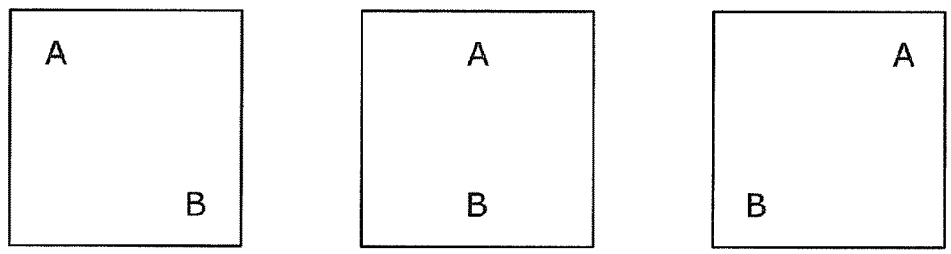
FIG. 7 shows a diagrammatic view of the security device perceived by the observer with two spatially separated symbols at different angles.

FIG. 7 is a simplified view showing how a symbol can move from the point of view of the observer. With an observation angle 30*a* the observer sees two different symbols defined in different partial regions (upper/lower half) of the security device. In this case, for example, a symbol (A) is produced in the top left corner by the +1st order diffraction and the other symbol (B) is produced in the bottom right corner by the −1st order. When the observer moves to the position 30b (FIG. 5) then one symbol (A) moves from the top left corner towards the right into the center and the other symbol (B) moves from the bottom right corner towards the left into the center. In the position 30c the upper symbol (A) moves further towards the right into the top right corner and the lower symbol (B) moves further towards the left into the left corner. The observer thus sees a continuous movement of the two symbols.

Figure 8:
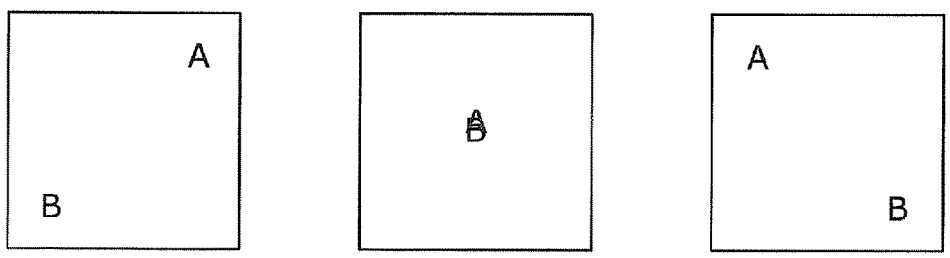
FIG. 8 shows a diagrammatic view of the security device perceived by the observer with the combination of two symbols which move about different focuses with different angles.

FIG. 8 shows a simplified view illustrating how a symbol can move from the point of view of the observer. With an observation angle 30a the observer sees two different symbols which respectively move about different focuses, at the upper edge (A) and at the lower edge (B). In this case, for example, the symbol in the top left corner is produced by the −1st order diffraction and the symbol in the bottom right corner is produced by the +1st order. When the observer moves to the position 30b (FIG. 5) the symbol moves from the top left corner towards the right into the center and the symbol moves from the bottom right corner towards the left into the center. In the position 30c the upper symbol moves further towards the right into the top right corner and the lower symbol moves further towards the left into the left corner. The observer thus sees a continuous movement of the two symbols.

Figure 9:
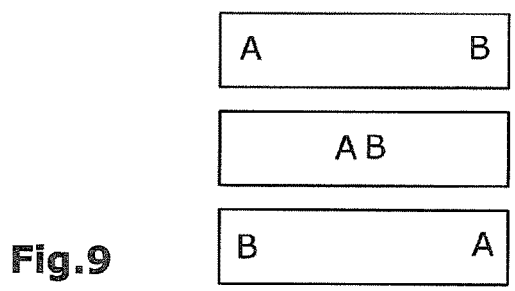
FIG. 9 shows a diagrammatic view of the security device perceived by the observer with the combination of two symbols whose path of movement approximately follows a straight line, with different angles.

FIG. 9 is a simplified view showing how two symbols can move from the point of view of the observer. With an observation angle 30a the observer sees two different symbols which move along an approximately linear path. In this case, for example, the symbol (A) at the left side is produced by the +1st order diffraction and the symbol (B) at the right side is produced by the −1st order. When the observer moves to the position 30b (FIG. 5) the symbol (A) moves from the left side into the center and the symbol (B) moves from the right side into the center. In the position 30c the symbol (A) moves further towards the right to the right side and the symbol (B) moves further towards the left to the left side. The observer thus sees a continuous movement of the two symbols.

Figure 10:
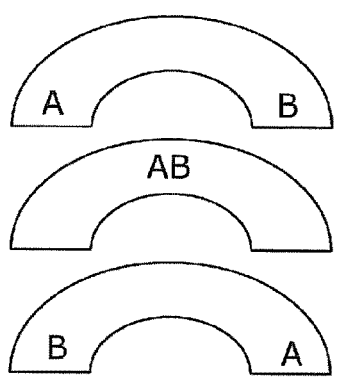
FIG. 10 shows a diagrammatic view of the security device perceived by the observer with the combination of two symbols whose path of movement follows a curved line with different angles.

FIG. 10 is a simplified view showing how two symbols can move from the point of view of the observer. In this case the movement corresponds to a movement similar to that described in FIG. 9, but on a curved path.

The invention claimed is:

1. A security device comprising:
a plurality of diffractive surface elements arranged on a carrier element;
wherein a surface covered by the diffractive surface elements on the carrier element occupy at least a partial region of the carrier element;
wherein each individual diffractive surface element has a three-dimensional surface structure;
wherein a portion of the plurality of the diffractive surface elements form a first surface element group comprising the portion of the plurality of diffractive surface elements, and an orientation of the diffractive surface elements in the first surface element group are matched to each other wherein together they make a single first point of an associated first symbol to be represented visible to an observer under particular observation conditions;
wherein a location of the first point in an observation space is variable and, after a change in an angle of incidence of a light or an observation angle, the first point is formed by diffractive surface elements of a same first surface element group;
wherein a plurality of additional surface element groups each make a respective additional point of the first symbol to be represented visible;
wherein the first symbol comprises a sum of all points represented by the first surface element group and the plurality of additional surface element groups; and
wherein a movement of the first symbol, which is continuous for the observer in an observation space, is perceived by a continuous change in an angle of incidence of the light or the observation angle.

2. The security device of claim 1, wherein a movement of the first symbol, which is continuous for the observer, is perceived by the continuous change in the angle of incidence of the light or the observation angle and follows a curved path, wherein a curvature of the curved path is extended so that the observer perceives a linear movement of the first symbol.

3. The security device of claim 1, wherein:
the first symbol is produced, for the observation angle, by less than 10% of the diffractive surface elements arranged on the carrier element;
the diffractive surface elements of respective surface element groups are provided in an irregular arrangement on the carrier element; and
at least 10% of the carrier element is covered with diffractive surface elements.

4. The security device of claim 1, wherein:
the diffractive surface elements are applied to the carrier element by applying a radiation-hardening lacquer to the surface of the carrier element;
the diffractive surface elements are structured in the radiation-hardening lacquer using a shaping element to shape the diffractive surface elements and hardening the radiation-hardening lacquer; and
the hardened radiation-hardening lacquer layer, after shaping of the diffractive surface elements, has a thickness of between 0.5 μm and 300 μm.

5. The security device of claim 1, wherein:
the carrier element comprises a thermoplastic material into which the diffractive surface elements are structured using a shaping element and pressure or heat to shape the diffractive surface elements during an embossing process.

6. The security device of claim 1, further comprising:
at least one light-reflecting layer, wherein the light-reflecting layer is applied to the diffractive surface elements or an underside of the carrier element, wherein the light-reflecting layer comprises a thin-film layer element or a metal.

7. The security device of claim 1, wherein:
a plurality of different symbols are visible to the observer and are particularly emphasized in a light intensity.

8. A security device comprising:
a plurality of diffractive surface elements arranged on a carrier element;
wherein a surface covered by the diffractive surface elements on the carrier element occupy at least a partial region of the carrier element;
wherein each individual diffractive surface element has a three-dimensional surface structure;
wherein a portion of the plurality of the diffractive surface elements form a first surface element group comprising the portion of the plurality of diffractive surface elements, and an orientation of the diffractive surface elements in the first surface element group are matched to each other wherein they make a first point of an associated first symbol to be represented visible to an observer under particular observation conditions;

wherein a plurality of additional surface element groups each make a respective additional point of the first symbol to be represented visible;

wherein the first symbol comprises a sum of all points represented by the first surface element group and the plurality of additional surface element groups;

wherein a movement of the first symbol, which is continuous for the observer in an observation space, is perceived by a continuous change in an angle of incidence of light or an observation angle;

wherein a plurality of symbols preferably having a same light intensity are perceived by the observer;

wherein perceived movement patterns of the plurality of symbols is in opposition; and wherein the plurality of the symbols are perceived to move towards each other as the observation angle becomes smaller.

9. The security device of claim 1, wherein:

the first symbol is configured to be perceived by the observer to increase or decrease in size responsive to the continuous change in the angle of incidence of the light or the observation angle.

10. A security device comprising:

a plurality of diffractive surface elements arranged on a carrier element;

wherein a surface covered by the diffractive surface elements on the carrier element occupy at least a partial region of the carrier element;

wherein each individual diffractive surface element has a three-dimensional surface structure;

wherein a portion of the plurality of the diffractive surface elements form a first surface element group comprising the portion of the plurality of diffractive surface elements, and an orientation of the diffractive surface elements in the first surface element group are matched to each other wherein they make a first point of an associated first symbol to be represented visible to an observer under particular observation conditions;

wherein a plurality of additional surface element groups each make a respective additional point of the first symbol to be represented visible;

wherein the first symbol comprises a sum of all points represented by the first surface element group and the plurality of additional surface element groups;

wherein a movement of the first symbol, which is continuous for the observer in an observation space, is perceived by a continuous change in an angle of incidence of light or an observation angle; and wherein the first symbol is configured to be perceived by the observer to have a distorted curved path responsive to the continuous change in the angle of incidence of the light or the observation angle.

11. A security device comprising:

a plurality of diffractive surface elements arranged on a carrier element;

wherein a surface covered by the diffractive surface elements on the carrier element occupy at least a partial region of the carrier element;

wherein each individual diffractive surface element has a three-dimensional surface structure;

wherein a portion of the plurality of the diffractive surface elements form a first surface element group comprising the portion of the plurality of diffractive surface elements, and an orientation of the diffractive surface elements in the first surface element group are matched to each other wherein they make a first point of an associated first symbol to be represented visible to an observer under particular observation conditions;

wherein a plurality of additional surface element groups each make a respective additional point of the first symbol to be represented visible;

wherein the first symbol comprises a sum of all points represented by the first surface element group and the plurality of additional surface element groups;

wherein a movement of the first symbol, which is continuous for the observer in an observation space, is perceived by a continuous change in an angle of incidence of light or an observation angle;

wherein a first portion of the plurality of the diffractive surface elements that form the first surface element group have grating constants that are equal to or less than 500 nm and a second portion of the plurality of the diffractive surface elements that form the first surface element group have grating constants that are equal to or greater than 1500 nm; and wherein a size relationship of largest of the grating constants to smallest of the grating constants is at least 3:1.

12. The security device of claim 1, wherein:

the security device further comprises at least one additional security feature or class of substance which provides at least one other diffractive, refractive, reflective, polarizing, phase-shifting, electrically conductive, magnetic, colored, fluorescent, phosphorescent or luminescent property, or provides at least one other electronic component.

13. The security device of claim 1, wherein the security device is configured to be machine-readable.

14. The security device of claim 1, wherein:

the security device comprises additional diffractive or refractive features; and the additional diffractive or refractive features for the observer appear either spatially separated from the first symbol or in superposition with the first symbol.

15. A security device comprising:

a plurality of diffractive surface elements arranged on a carrier element;

wherein a surface covered by the diffractive surface elements on the carrier element occupy at least a partial region of the carrier element;

wherein each individual diffractive surface element has a three-dimensional surface structure;

wherein a portion of the plurality of the diffractive surface elements form a first surface element group comprising the portion of the plurality of diffractive surface elements, and an orientation of the diffractive surface elements in the first surface element group are matched to each other wherein they make a first point of an associated first symbol to be represented visible to an observer under particular observation conditions;

wherein a plurality of additional surface element groups each make a respective additional point of the first symbol to be represented visible;

wherein the first symbol comprises a sum of all points represented by the first surface element group and the plurality of additional surface element groups;

wherein a movement of the first symbol, which is continuous for the observer in an observation space, is perceived by a continuous change in an angle of incidence of light or an observation angle;

the security device further comprising a light refracting layer comprising a plurality of refracting elements that form a second symbol, which is a replicate or a modified replicate of the first symbol, to be represented visible; and wherein the first symbol and the second symbol are configured to be perceived by the observer to move, about or around a focus established by the security device, in a group responsive to the angle of incidence or the observation angle being changed.

16. The security device of claim 1, further comprising:
a protective layer disposed over the diffractive surface elements, the protective layer having a first refractive index differing from a second refractive index of a material from which the diffractive surface elements are formed by at least 0.03 units.

17. The security device of claim 1, wherein the security device is a security thread, a tear-open thread, a security strip, a security band, a patch or a label configured to be applied to a carrier material, wherein the carrier material comprises paper, polymer or a paper-like composite material.

18. The security device of claim 1, wherein the security device is configured to be a component of a value-bearing element or a security document or a brand-protection device.

19. A method of producing a security device, comprising:
arranging a plurality of diffractive surface elements on a carrier element;
wherein a surface covered by the diffractive surface elements on the carrier element occupy at least a partial region of the carrier element;
wherein each individual diffractive surface element has a three-dimensional surface structure;
wherein a portion of the plurality of the diffractive surface elements form a first surface element group comprising the portion of the plurality of diffractive surface elements, and an orientation of the diffractive surface elements in the first surface element group are matched to each other wherein together they make precisely a single first point of an associated first symbol to be represented visible to an observer under particular observation conditions;
wherein a location of the first point in an observation space is variable and, after a change in an angle of incidence of a light or an observation angle, the first point is formed by diffractive surface elements of a same first surface element group;
wherein a plurality of additional surface element groups each make a respective additional point of the first symbol to be represented visible;
wherein the first symbol comprises a sum of all points represented by the first surface element group and the plurality of additional surface element groups; and
wherein a movement of the first symbol, which is continuous for the observer in an observation space, is perceived by a continuous change in an angle of incidence of light or an observation angle.

20. The method of claim 19, further comprising:
attaching the carrier element to a value bearing device or a security document or a brand-protection device.

* * * * *